US008018093B2

(12) United States Patent
Miermont et al.

(10) Patent No.: US 8,018,093 B2
(45) Date of Patent: Sep. 13, 2011

(54) ELECTRONIC CIRCUIT POWER SUPPLY DEVICE AND ELECTRONIC CIRCUIT

(75) Inventors: Sylvain Miermont, Grenoble (FR); Edith Beigne, Meaudre (FR); Pascal Vivet, Saint Paul de Varces (FR)

(73) Assignee: Commissariat a l'Energie Atomique, Paris (FR)

( * ) Notice: Subject to any disclaimer, the term of this patent is extended or adjusted under 35 U.S.C. 154(b) by 419 days.

(21) Appl. No.: 12/122,367

(22) Filed: May 16, 2008

(65) Prior Publication Data

US 2008/0284407 A1    Nov. 20, 2008

(30) Foreign Application Priority Data

May 18, 2007   (FR) ..................................... 07 55129

(51) Int. Cl.
*H02J 1/00* (2006.01)
(52) U.S. Cl. .......................... 307/80; 327/540; 365/203
(58) Field of Classification Search .......... 323/272–281, 323/284, 286, 299, 300; 307/74–75, 80–85; 327/538–540; 365/203, 207, 226
See application file for complete search history.

(56) References Cited

U.S. PATENT DOCUMENTS

| | | | |
|---|---|---|---|
| 5,305,270 A * | 4/1994 | Kim ............................... 365/203 |
| 6,002,295 A | 12/1999 | Gens et al. | |
| 6,289,465 B1 | 9/2001 | Kuemerle | |
| 6,326,827 B1 | 12/2001 | Cretti et al. | |
| 6,389,465 B1 * | 5/2002 | Peterson et al. .............. 709/220 |
| 6,566,935 B1 | 5/2003 | Renous | |
| 6,583,607 B1 | 6/2003 | Marty et al. | |
| 6,825,711 B2 | 11/2004 | Cohn et al. | |
| 7,113,430 B2 | 9/2006 | Hoefler et al. | |
| 7,205,682 B2 * | 4/2007 | Kuramori ........................ 307/80 |
| 2003/0212916 A1 | 11/2003 | Ito et al. | |

FOREIGN PATENT DOCUMENTS

EP    1081572    3/2001

OTHER PUBLICATIONS

French Search Report, Dec. 6, 2007.
Calhoun and Chandrakasan, "Ultra-Dynamic Voltage Scaling (UDVS) Using Sub-threshold Operation and Local Voltage Dithering", IEEE Journal of Solid-State Circuits, vol. 41, No. 1, Jan. 2006, XP-002461237.
M. H. Anis, S. Areibi, M. I. Elmsary. Design and Optimization of Multi-Threshold Cmos (MTCMOS) Circuits, in IEEE Trans. On CAD, vol. 22, issue 10, Oct. 2003.

(Continued)

*Primary Examiner* — Rajnikant B Patel
(74) *Attorney, Agent, or Firm* — Brinks Hofer Gilson & Lione

(57) ABSTRACT

An electronic circuit power supply device configured to selectively apply at least one first voltage or one second voltage to a power supply terminal of the electronic circuit that includes elements for applying to the power supply terminal a voltage variable from a value equal to the first voltage to a value equal to the second voltage and elements designed for selecting application of the second voltage to the power supply terminal when the variable voltage reaches the second voltage.

13 Claims, 4 Drawing Sheets

OTHER PUBLICATIONS

B. H. Calhoun, A. P. Chandrakasan. Ultra-Dynamic Voltage Scaling using Sub-threshold Operation and Local Voltage Dithering in 90nm CMOS. In Proceedings of Intl. Solid-State Circuits Conference (ISSCC), Feb. 2005.

M. Hammes, C. Kranz, J. Kissing, D. Seippel, P.-H. Bonnaud, E. Peloso A GSM Baseband Radio in 0.13JLm CMOS with Fully Integrated Power-Management. In Proceedings of Intl. Solid State Circuits Conf. (ISSCC), Feb. 2007.

F. Ichiba, K. Suzuki, S. Mita, T. Kuroda, T. Furuyama. Variable supply-voltage scheme with 95% efficiency DC-DC converter for MPEG-4 codec. In Proceedings of Int. Symposium on Low Power Electronics and Design (ISLPED), Aug. 1999.

A. Iyer, D. Marculescu. Power and Performance Evaluation of Globally Asynchronous Locally Synchronous Processors. In Proceedings of Intl. Symposium on Computer Architecture (ISCA), May 2002.

H. Kawaguchi, G. Zhang, S. Lee, T. Sakurai. An LSI for VDD-Hopping and MPEG4 System Based on the Chip. In Proceedings of Intl. Symposium on Circuits and Systems (ISCAS), May 2001.

D. Lattard, E. Beigne, C. Bernard, C. Bour, F. Clermidy, Y. Durand, J. Durupt, D. Varreau, P. Vivet, P. Penllol'd, A. Bouttier, F. Berens. A Telecom Baseband Circuit-Based on an Asynchronous Network-on-Chip. In Proceedings of Intl. Solid State Circuits Conf. (ISSCC), Feb. 2007.

S. Lee, T. Sakurai. Run-Time Voltage Hopping for Low-Power Real-Time Systems. In Proceedings of Design Automation Conf. (DACc), Jun. 2000.

Y. W. Li, G. Patounakis, A. Jose, K. L. Shepard, S. M. Nowick. Asynchronous Data-path with software-controlled on-chip adaptive voltage scaling for multirate signal processing applications. In Proceedings of Intl. Symposium on Asynchronous Circuits and Systems (ASYNC), May 2003.

T. NjOlstad, O. Tjore, K. Svarstad, L. Lundheim, T. 0. Vedal, J. Typpo, T. Ramstad, L. Wanhammar, E. J. Alloy', H. Danielsen. A Socket Interface for GALS using Locally Dynamic Voltage Scaling for Rate-Adaptive Energy Saving. In Proceedings of ASIC/SOC Conf., Sep. 2001.

Y. Xu, T. Miyazaki, H. Kawaguchi, T. Sakurai. Fast Block-Wise VDD-Hopping Scheme. In Proceedings of IEICE Society Con!., Sep. 2003.

Y. Zhu, F. Mueller. Feedback EDF Scheduling Exploiting Dynamic Voltage Scaling. In Proceedings of Real-Time and Embedded Technology and Applications Symposium (RTAS), May 2004.

* cited by examiner

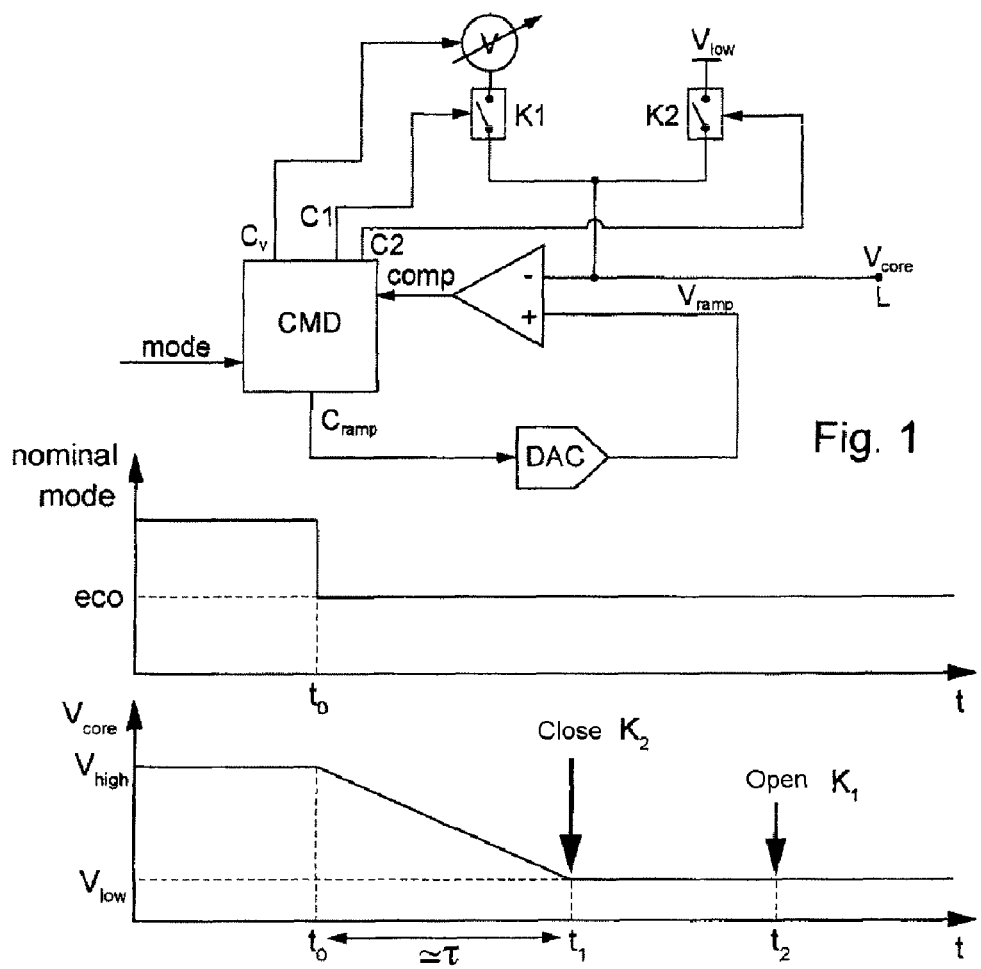
Fig. 1
Fig. 2
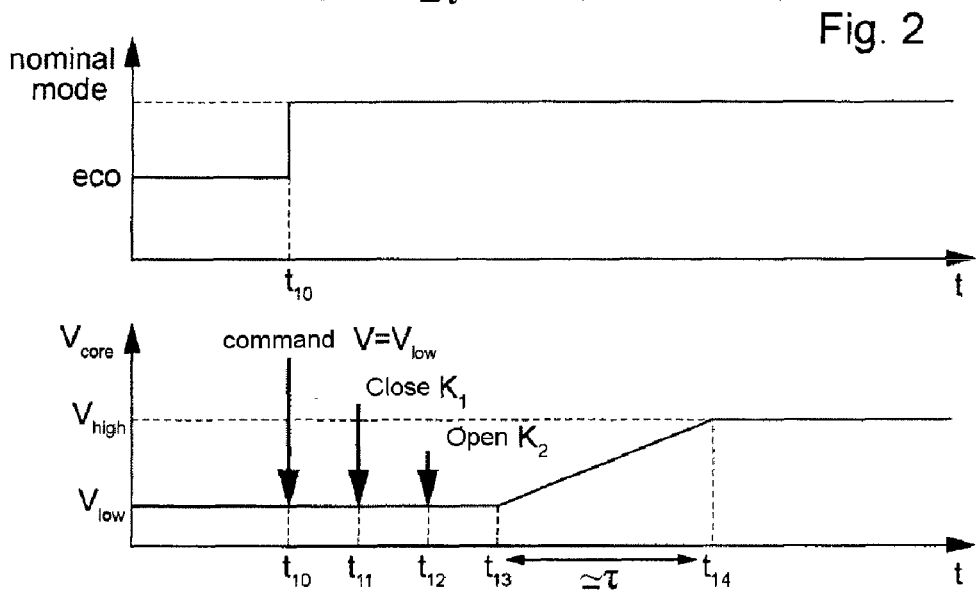
Fig. 3

ELECTRONIC CIRCUIT POWER SUPPLY DEVICE AND ELECTRONIC CIRCUIT

PRIORITY CLAIM

This application claims priority to French Patent Application No. 0755129, filed May 18, 2007. The disclosure of which is incorporated by reference herein.

TECHNICAL FIELD

The present invention concerns an electronic circuit power supply device and an associated electronic circuit.

BACKGROUND

In logic electronic circuits, in particular those produced in the CMOS technology, it is known that the average electrical power consumed varies approximately with the square of the power supply voltage of the electronic circuit, while the information propagation time (and thus the time necessary to execute a given operation) is approximately inversely proportional to that power supply voltage.

It is therefore possible to reduce the energy consumed for a given operation (equal to the product of the power consumed and the time necessary for the operation) by reducing the power supply voltage, if the function involved makes a compromise on the speed of execution of the operation possible, of course.

In this context, it has been proposed, for example in the papers "An LSI for Vdd-Hopping and MPEG4 System Based on the Chip", in the proceedings of the IEEE Intl. Symp. on Circuits and Systems (ISCAS), 2001, and "Fast Block-Wise Vdd-Hopping Scheme", in the proceedings of the IEICE Society Conference, 2003, to select the power supply voltage as either a high voltage for operation of the electronic circuit under a nominal regime (short operation execution times) or a low voltage for low power consumption.

In such systems, problems arise during phases of transition between the high and low voltages, for example because of injection of current from the high-voltage supply to the low-voltage supply if the two voltages are applied simultaneously to prevent any interruption in power supply.

SUMMARY

To solve notably these problems, the invention proposes an electronic circuit power supply device including means for selectively applying at least a first voltage or a second voltage to a power supply terminal of the electronic circuit, characterized by means for applying to the power supply terminal a voltage variable from a value equal to the first voltage to a value equal to the second voltage and means for selecting application of the second voltage to the power supply terminal when the variable voltage reaches the second voltage.

This ensures continuity of application of voltage to the power supply terminal of the electronic circuit without creating harmful phenomena such as injection of current from one supply to the other, because the second voltage is selected only when it is equal to the variable voltage applied beforehand.

The means for applying a variable voltage can be adapted also to generate voltage values outside the range delimited by the respective values of the first and second voltages. In particular, when the first voltage is higher than the second voltage, the means for applying a variable voltage can be adapted to apply a voltage value lower than the second voltage so as to be certain to prevent any current injection phenomenon. In practice, these means can be implemented by a circuit adapted to generate a voltage between the first voltage and a zero voltage.

There may further be provided means for measuring a measured voltage at the power supply terminal, in which case the means for applying the variable voltage are for instance adapted to determine the variable voltage as a function of the measured voltage. Such control loops improve control of the voltage actually applied and thus ensure good operation of the device.

In practice, the means for applying the variable voltage comprise a voltage ramp generator, a comparator of the measured voltage and the voltage generated by the generator, and means for forming the variable voltage as a function of a comparison generated by the comparator, for example.

In an analogous manner, there can be provided, for passing from the second voltage to the first voltage, means for applying the variable voltage to the power supply terminal when the second voltage is applied to the power supply terminal, means for canceling application of the second voltage when the variable voltage is applied, and means for changing the variable voltage from a value equal to the second voltage to a value equal to the first voltage.

In one possible embodiment, the means for generating the variable voltage can comprise at least one transistor connected to a fixed voltage.

In this case, the means for generating the variable voltage can for example comprise a plurality of transistors having a common drain and a common source, one of which is connected to a fixed voltage, and gates adapted to be controlled independently.

The first voltage can then be connected to the power supply terminal via said at least one transistor. The fixed voltage is equal to the first voltage, for example.

In this context, the second voltage can be connected to the power supply terminal via a transistor separate from said at least one transistor and controlled by said means for selecting application of the second voltage to the power supply terminal.

In practice, the device can be produced in the CMOS technology.

These features contribute to a particularly simple and effective implementation.

The first voltage is higher than the second voltage, for example, as in the embodiments described hereinafter, for example.

The first voltage can correspond to a nominal power supply voltage of the electronic circuit, in which case the second voltage can be the power supply voltage in a low power consumption regime.

It should be noted that, in some embodiments that can be envisaged, means for generating the applied second voltage are adapted to generate a variable voltage. The device can use a plurality of variable voltages if it ensures continuity not only of application of the voltage but also of the applied voltage values.

Similarly, the means for selectively applying the first voltage and the second voltage can be adapted to apply at least one third voltage not between the first voltage and the second voltage to the power supply terminal. The invention is not limited to the situation in which the device provides two power supply voltages, but to the contrary applies equally to situations in which three or more power supply voltages are envisaged.

The invention also proposes an electronic circuit comprising a power supply device as described hereinabove, characterized in that it comprises a power supply management circuit adapted to control the power supply device.

BRIEF DESCRIPTION OF THE DRAWING

Other features and advantages of the invention will become apparent in the light of the following description, given with reference to the appended drawings, in which:

FIG. 1 represents the essential elements of one example of a power supply device conforming to the teachings of the invention;

FIG. 2 shows certain signals during a transient downward phase in the context of the device from FIG. 1;

FIG. 3 shows certain signals during a transient upward phase in the context of the device from FIG. 1;

DETAILED DESCRIPTION

Figure 4:
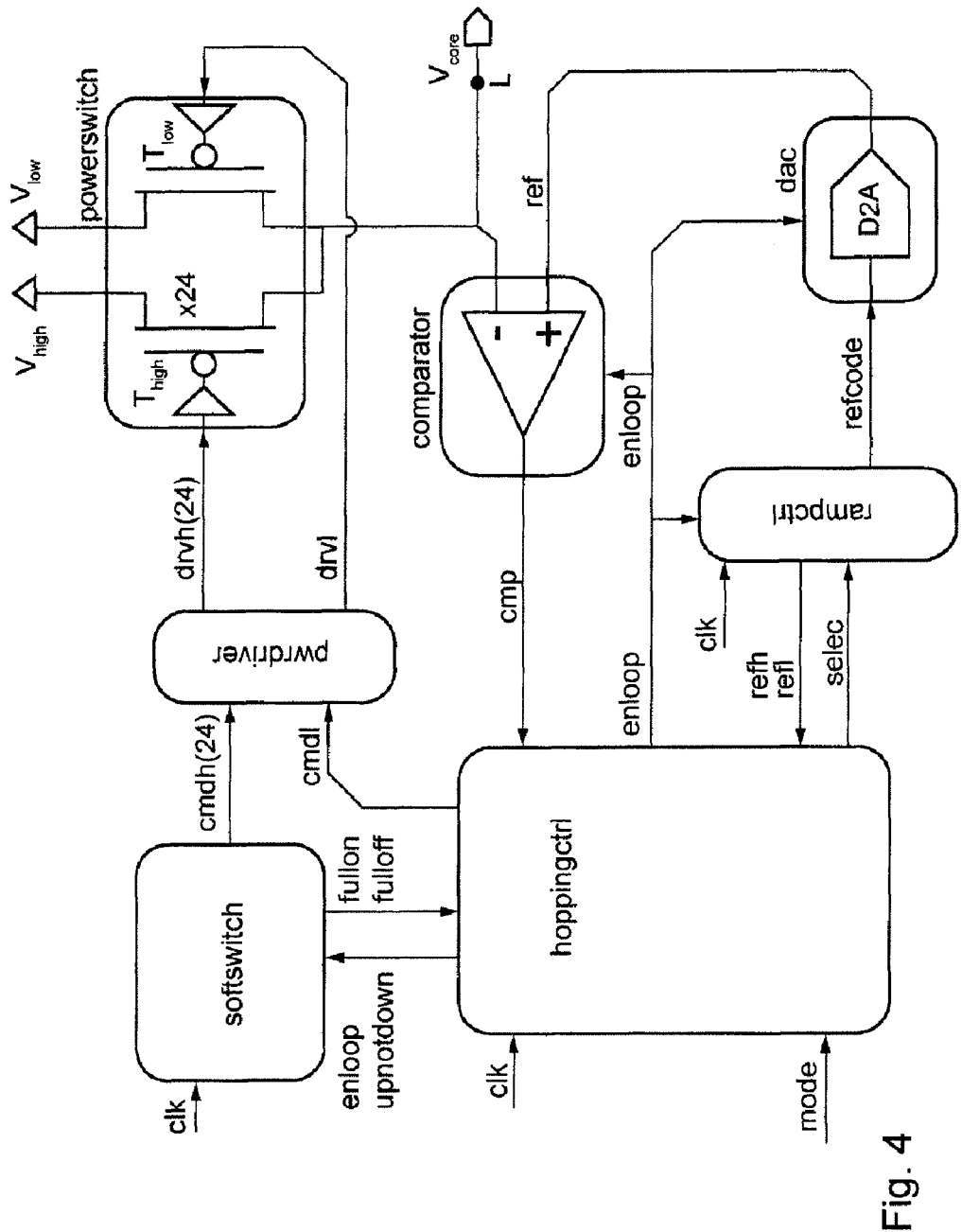
FIG. 4 shows one embodiment of a power supply device conforming to the teachings of the invention.

FIG. 1 is a block diagram showing the essential elements of one embodiment of the invention.

The power supply device from FIG. 1 comprises a first voltage source adapted to deliver a voltage V that is varied as a function of a control signal $C_v$ (the source of which is indicated hereinafter) and a second source adapted to deliver a voltage $V_{low}$, which here is a fixed voltage.

The first voltage source (voltage V) is connected to a power supply terminal L of an electrical load supplied with power by the device via a first controlled switch $K_1$. The second voltage source (voltage $V_{low}$) is connected to the power supply terminal L via a second controlled switch $K_2$.

The switches $K_1$, $K_2$ are controlled by respective signals $C_1$, $C_2$ from a control module CMD.

Under a steady state regime, the control module CMD receives from a power supply management module (not shown) a signal mode on the basis of which the control module CMD commands the switches $K_1$, $K_2$ to apply either the voltage V from the first source or the voltage $V_{low}$ from the second source to the power supply terminal L.

Thus, under the steady state regime, the control module CMD applies the voltage V or $V_{low}$ from only one of the two sources according to the mode indicated by the signal mode (nominal voltage or power saving). The control module CMD closes the switches $K_1$, $K_2$ simultaneously, on the other hand, in certain periods of the transition phase from one voltage source to the other, as explained in more detail hereinafter.

Hereinafter, $V_{core}$ designates the voltage at the power supply terminal L.

As can be seen in FIG. 1, the device described here also includes a comparator which receives at its negative input the aforementioned voltage $V_{core}$ and at its positive input a voltage $V_{ramp}$ generated by a digital-analog converter DAC on the basis of a control signal $C_{ramp}$ generated by the control module CMD.

The signal comp at the output of the comparator is fed back to the control module CMD.

The operation of the device from FIG. 1 during transitions between the nominal operating voltage $V_{high}$ and the voltage $V_{low}$ for operation with reduced power consumption is described in outline next.

An example of transition from the high voltage $V_{high}$ to the low voltage $V_{low}$ is described first with reference to FIG. 2.

In this context, before the transition is initiated by the change in the signal mode at a time to (i.e. under steady state conditions of operation at nominal voltage), the source of the variable voltage V is commanded by the control module CMD (signal $C_v$) to generate a voltage equal to $V_{high}$ and the switch $K_1$ is closed (by an appropriate control signal $C_1$) in order to apply the voltage $V_{high}$ to the power supply terminal L: thus $V_{core}=V_{high}$ (ignoring voltage drops in the switch $K_1$, which are not taken into account here but are considered in the embodiment proposed hereinafter).

Naturally, during the period of operation under the nominal regime preceding the transition (i.e. before the time $t_0$), the control module CMD applies a signal $C_2$ such that the switch $K_2$ is open. Moreover, the digital-analog converter DAC and the comparator are inactive (and so these circuits are not necessarily supplied with power outside the transient phases, as explained with reference to the embodiment described hereinafter, which in particular reduces the power consumption of the device from FIG. 1).

At the time $t_0$, the signal mode received by the control module CMD goes from a value indicating operation under the nominal regime to a value indicating operation with reduced power consumption (labeled "eco" in FIG. 2).

When it detects this change of state of the signal mode, the control module CMD sends the digital-analog converter DAC a command signal $C_{ramp}$ that causes the digital-analog converter DAC to generate a voltage ramp varying from the voltage $V_{high}$ to the voltage $V_{low}$ over a predefined time period T.

The change in the signal mode also leads to activation of the comparator, which delivers a signal comp representative of the difference between the voltage $V_{core}$ at the power supply terminal L and the voltage $V_{ramp}$ generated by the digital-analog converter DAC.

Because the voltage $V_{ramp}$ forms a falling ramp, the comparator quickly indicates after the time to a difference between the voltage $V_{core}$ at the power supply terminal L and the decreasing voltage ramp, and therefore sends a signal comp indicating this difference. The control module CMD then reacts by producing a signal $C_v$ that leads to reduction of the variable voltage V with a view to reducing the difference measured by the comparator.

The voltage $V_{core}$ at the power supply terminal L is therefore slaved to the voltage generated by the digital-analog converter DAC and therefore also forms a falling ramp with the same duration as the ramp generated by the digital-analog converter DAC (possibly with a slight delay, depending on the design of the circuit elements).

The control module CMD is also designed to command closing of the switch $K_2$ (via the signal $C_2$) when the voltage generated by the digital-analog converter DAC has reached the value $V_{low}$ (i.e. at the end of a time T from the change of the signal mode), and consequently when the variable voltage V has also reached the voltage $V_{low}$ (by virtue of the control system described above). This condition can be detected by the control module CMD not only on the basis of the value $C_{ramp}$ sent to the converter DAC, but also on the supplementary condition that the signal comp indicates that the voltage $V_{core}$ fell briefly below the value $V_{ramp}$. It is therefore certain that the control system has had time to function, which is particularly beneficial if the voltage $V_{core}$ is delayed relative to the voltage $V_{ramp}$, for example because of the use of a load having a high capacitive component.

From the time $t_1$ of closing of the switch $K_2$, the voltages from both voltage sources (the first source of the variable voltage V and the second source of the voltage $V_{low}$, which here is fixed) are therefore applied to the power supply terminal L, without causing any problem of injection of current between the sources thanks to the equal values of the voltages generated by those sources at that time.

The switch $K_1$ can then be opened at a time $t_2$ after the time $t_1$, which terminates the transition phase because the power supply terminal L is then connected only to the second source of the voltage $V_{low}$ (reduced voltage for reduced power consumption).

It may be noted that the transition from the high-voltage supply (here the nominal voltage) to the low-voltage supply is effected over a predefined time by virtue of using a predetermined voltage ramp (and, in the example described hereinabove, also by virtue of slaving the effective voltage $V_{core}$ at the power supply terminal L to this voltage ramp).

A transition phase from a low power supply voltage $V_{low}$ to a high power supply voltage $V_{high}$ is studied next with reference to FIG. 3.

Before the start of the transition, i.e. before the change of state of the signal mode received by the control module CMD, the device provides a power supply at the low voltage $V_{low}$ at the terminal L: to this end, before the change of state of the signal mode (at the time $t_{10}$ as described hereinafter), the control module CMD delivers a signal $C_2$ to the switch $K_2$ so that it is closed.

Under the steady state regime of supply of power at the low voltage $V_{low}$, the switch $K_1$ is open (a corresponding signal $C_v$ is sent by the control module CMD) and the source of the variable voltage V is at a level that is immaterial (or, in some embodiments, could even be turned off).

As already indicated with reference to FIG. 2, the comparator and the digital-analog converter DAC are inactive and, in order to reduce the electrical power consumption of the power supply device, could receive no power.

If the control module detects the signal mode changing to a level indicating operation under a power saving regime to a level indicating operation under the nominal regime (time $t_{10}$), by means of the signal $C_v$ it commands the source of the variable voltage V to deliver a voltage equal to the low voltage $V_{low}$.

After a predetermined time period (linked in particular to the response time of the source of the variable voltage V in order to be sure that the source of the voltage V is delivering a voltage equal to $V_{low}$), the control module CMD causes the switch $K_1$ to be closed by sending an appropriate command signal $C_1$ (time $t_{11}$).

At this moment, the load is therefore supplied with power (at the power supply terminal L) by the two voltage sources simultaneously, the first source of the voltage V via the switch $K_1$ and the second source of the voltage $V_{low}$ via the switch $K_2$. However, because the source of the variable voltage V was previously adjusted to the low voltage $V_{low}$, this simultaneous supply of power by the two current sources is achieved without problems, in particular without injection of current from one source into the other.

The switch $K_2$ is then opened (again by sending a command signal, here the signal $C_2$, by the control module CMD), so that only the voltage V from the first voltage source (still supplying the voltage $V_{10}$) is applied to the power supply terminal L (time $t_{12}$).

The supply of power has therefore been changed from one source to the other without interruption of the power supply.

After a predetermined time period following the command to open the switch $K_2$ (which depends on the response time of that switch in order to open it, and can therefore be relatively short), the control module CMD sends a signal $C_{ramp}$ (time $t_{13}$) which causes the digital-analog converter DAC to generate a rising voltage ramp, between the voltage $V_{low}$ and the voltage $V_{high}$, over a predetermined time period T.

It may be noted that the time periods involved (and the slope of the ramp) can be programmed, for example by means of instructions received from a power supply management module.

In a mode of operation analogous to that described with reference to FIG. 2, by virtue of slaving the voltage $V_{core}$ of the power supply terminal L to the voltage $V_{ramp}$ generated by the digital-analog converter DAC (by means of the signal comp and by generating a command $C_v$ as a function of that signal comp to reduce the difference between $V_{ramp}$ and $V_{core}$), the control module CMD causes a variation of the voltage V from the first source which tracks that of the rising ramp, to the voltage $V_{high}$ at a time $t_{14}$ following the time $t_{13}$ by a time period approximately equal to T.

Accordingly, at the time $t_{14}$, the source of the voltage V delivers at the power supply terminal L a voltage equal to the high voltage $V_{high}$ of the normal operating regime. That nominal regime having been reached, the control module CMD can inactivate the comparator and the digital-analog converter DAC. Operation then continues under the steady state regime supplying power at the nominal voltage $V_{high}$.

It may be noted that in this case also, because the various time intervals involved in the transition are predetermined, the duration of the transition is predefined.

A more detailed embodiment of the invention is described next with reference to FIG. 4, although it uses the general operating principles described hereinabove with reference to FIGS. 1 to 3. The various elements of the circuit shown in FIG. 4 are described first, produced here in the CMOS technology, before explaining the operation of the device, in particular during the transition phases.

The power supply device represented in FIG. 4 is a power supply selector the general object of which is to apply selectively one of the voltages $V_{high}$ (high voltage) and $V_{low}$ (low voltage) to a power supply terminal L the voltage at which is hereinafter designated $V_{core}$.

The power supply terminal L is connected to the sources of the voltages $V_{high}$ and $V_{low}$ via a power switch (powerswitch in FIG. 4) consisting of PMOS power transistors each controlled by an inverter.

Each inverter (and therefore each PMOS transistor) is controlled by a signal generated by a power control circuit (pwrdriver in FIG. 4).

To be more precise, the source of the voltage $V_{low}$ is connected to the power supply terminal L by a single PMOS transistor $T_{low}$, here having a gate length equal to the technology minimum (65 nm in the embodiment described here). This transistor $T_{low}$ is controlled by a signal drvl generated by the power control circuit.

The width of the aforementioned PMOS transistor is chosen to reduce resistive losses (for example to limit the voltage drop to 3% maximum of the voltage $V_{low}$ when the power consumption of the load is at the maximum) without excessively increasing the width and therefore the area occupied by the transistor.

The power control circuit is moreover designed so that switching the aforementioned PMOS transistor on or off is relatively slow (several clock cycles, i.e. around 5 to 10 ns in the example described here).

The source of the voltage $V_{high}$ is connected to the power supply terminal L via a plurality of (24 in the example shown in FIG. 4) PMOS power transistors Thigh having a gate length equal to the technology minimum (65 nm as indicated hereinabove). The drains, sources and substrates of all these transistors $T_{high}$ (connecting $V_{high}$ to L) are common; on the other hand, their gates are separate and each is controlled by a separate signal drvh from the power control circuit. The transistors $T_{high}$ connecting the source of the voltage $V_{high}$ to the power supply terminal L have widths such that the resistive losses (and consequently the voltage drop) are low when all the transistors of the set are conducting, but also such that there is a significant voltage drop when only one of the transistors of the set is conducting: accordingly, by appropriately controlling opening and closing of the transistors by means of the signals drvh, the voltage applied to the power supply terminal L can be varied between approximately the voltage $V_{high}$ (all transistors conducting and therefore minimum voltage drop) and a low voltage (only one transistor conducting and therefore maximum voltage drop).

As will be understood from explanations below, the number of PMOS transistors connecting the source of the voltage $V_{high}$ and the power supply terminal L must be made sufficiently large to reduce the voltage step each time a transistor is turned on or off (in order to approximate as closely as possible a source of continuously variable voltage), without the time necessitated by successively commanding each of the transistors of the set (at the maximum one command per clock period) being too long compared to the transition to be effected, as described hereinafter.

The power control circuit pwrdriver is furthermore designed so that the times of switching on and switching off the transistors $T_{high}$ connecting the source of the voltage $V_{high}$ to the power supply terminal L are relatively short (less than one clock cycle, i.e. around 200 ps in the example described here).

The FIG. 4 power supply selector comprises a clock (not shown) which generates a clock signal clk for the various logic elements of the circuit, as shown in FIG. 4. The frequency of the clock is between 400 MHz and 1.2 GHz, for example.

The FIG. 4 power supply selector also comprises a logic switch (softswitch) implemented in sequential synchronous logic, for example, which forms at the output (signals cmdh) a "thermometer code", here on 24 bits, i.e. a signal cmdh (here a word of 24 bits) in which the number of bits at 1 increases (or decreases) successively, for example in each clock period.

The softswitch is controlled by a control unit (described hereinafter) and to be more precise by a signal enloop that controls the evolution of the thermometer code (i.e. the outputs cmdh) and a signal upnotdown which controls the increase or the decrease in the number of bits at 1 in the output signal cmdh: when the activation signal enloop is at 0, the output word cmdh is unchanged; on the other hand, when the activation signal enloop has the value 1:

if the signal upnotdown is at 1, the element successively changes its output cmdh to 1, on each clock pulse, starting with the least significant output at 0, until they are all at 1;

if the signal upnotdown is at 0, the element changes its outputs cmdh successively to 0, one on each clock pulse, starting with the most significant output at 1, until they are all at 0.

The softswitch sends back to the control unit a signal fullon indicating that all the bits of the word cmdh are at 1 and a signal fulloff indicating that all the bits of the word cmdh are at 0.

The word cmdh generated by the softswitch is sent to the power control circuit pwrdriver in order for each bit of the word cmdh to control a control signal of a corresponding transistor $T_{high}$.

Accordingly, the combination of the softswitch and the power switch associated with the source of the voltage $V_{high}$ can be seen as a "complex" transistor whose effective width is modulated as a function of the control signal received from the control unit via the signals enloop and upnotdown which, by controlling the word cmdh, progressively increase or decrease the effective width of this complex transistor, and therefore as already mentioned hereinabove vary the voltage drop at the level of the power switch.

The complex transistor formed by the plurality of transistors associated with the source of the fixed voltage $V_{high}$ therefore executes the functions of the switch $K_1$ and of the source of the variable voltage V described with reference to FIG. 1.

The FIG. 4 power supply selector also comprises a ramp generator (rampctrl in FIG. 4), implemented in sequential synchronous logic and associated with a digital-analog converter (dac in FIG. 4) in order to generate linear voltage ramps between the high voltage $V_{high}$ and a value close to the low voltage $V_{low}$ (to be precise a voltage value $V_{low}-\Delta_{ramp}$).

Hereinafter ref designates the output node of the digital-analog converter and $V_{ref}$ its voltage.

The ramp generator rampctrl also receives the signal enloop from the control unit and places the output of the digital-analog converter in a high impedance state if the signal enloop has the value 0, whereas it generates a ramp as explained hereinafter if the signal enloop has the value 1.

To this end, the ramp generator also receives from the control unit a signal selec that has the value 0 when the control unit is requesting the generation of a rising ramp (i.e. for the voltage $V_{ref}$ to tend toward the voltage $V_{high}$) and has the value 1 when the control unit is requesting the generation of a falling ramp (i.e. when $V_{ref}$ must tend toward $V_{low}-\Delta_{ramp}$).

In return, the ramp generator sends signals refh and refl respectively indicating that the output voltage has reached the upper or lower limit of the ramp.

The digital-analog converter used is adapted to the required voltage step, which can be of the same order as that generated in the power switch.

The ramp parameters can be predetermined: the duration is between 30 and 500 clock cycles, for example, while the value $\Delta_{ramp}$ used is between −20 mV and 60 mV, for example.

Alternatively, these parameters could naturally be varied by means of control signals sent by the control unit, for example, or any other logical element of the circuit or the load.

The power supply selector from FIG. 4 also comprises a comparator that receives at its negative input the voltage $V_{core}$ from the power supply terminal L and at its positive input the voltage $V_{ref}$ at the output ref of the digital-analog converter. The comparator outputs a signal cmp representing the difference between the voltage $V_{core}$ and the voltage $V_{ref}$.

The comparator is chosen for fast operation (less than one clock period or approximately 200 ps in the embodiment described here) and must also have an operating range that more than covers the range of voltages that are applied to it (for example between approximately $V_{high}$ and $\frac{3}{4} V_{low}$).

The control unit copies the signal cmp generated by the comparator to form the signal upnotdown sent to the softswitch. To be more precise, the signal upnotdown has the value 1 when the output of the comparator is positive, i.e. the voltage $V_{ref}$ (which serves as a set point) is higher than the voltage $V_{core}$, and has the value 0 when the output of the comparator is negative, i.e. when the voltage $V_{core}$ is higher than the voltage $V_{ref}$.

Thus the comparator, the softswitch and the power switch form a loop that slaves the voltage $V_{core}$ to the voltage $V_{ref}$.

When the voltage $V_{core}$ is above the voltage $V_{ref}$, the softswitch reduces the effective size of the $V_{high}$ side transistor, which reduces the voltage $V_{core}$. Conversely, when the voltage $V_{core}$ is below the voltage $V_{ref}$, the softswitch increases the effective size of the $V_{high}$ side transistor, which increases the voltage $V_{core}$.

In practice, because the response time of the system is not zero, the voltage $V_{core}$ oscillates around the voltage $V_{ref}$. The amplitude of these oscillations is a function of the clock frequency, the reaction time of the comparator, the reaction time of the power switch and the voltage step chosen for the division of the complex transistor formed by the transistors $T_{high}$.

Under the steady state regime (stable phase), the load is supplied with power at the terminal L by one or other of the sources of the voltages $V_{high}$ and $V_{low}$ (i.e. either the set of transistors $T_{high}$ connecting the voltage $V_{high}$ are conducting and the transistor $T_{high}$ connecting the voltage $V_{low}$ is turned off, or, conversely, the set of transistors $T_{high}$ connecting the voltage $V_{high}$ are turned off and the transistor $T_{high}$ connecting the voltage $V_{low}$ is turned on).

There can be provision for the clock (not shown) to be switched off in this phase and for the comparator (supplied with power by the source $V_{high}$, for example) and the digital-analog converter to be switched to the low consumption state.

The control unit (or hopping controller, hoppingctrl in FIG. 4), already mentioned more than once, is a sequential synchronous logic element that manages transitions as explained in detail hereinafter. The control unit receives a signal mode sent by a module (not shown) for managing the supply of power to the load and indicating the required mode of operation (high voltage for nominal operation or low voltage for low power consumption).

The control unit detecting a transition in the signal mode that it receives from the module for managing the supply of power to the load activates the various elements and starts a transient phase (which could be referred to as a "hopping sequence"). Both possible types of transient phase are described next.

Figure 5:
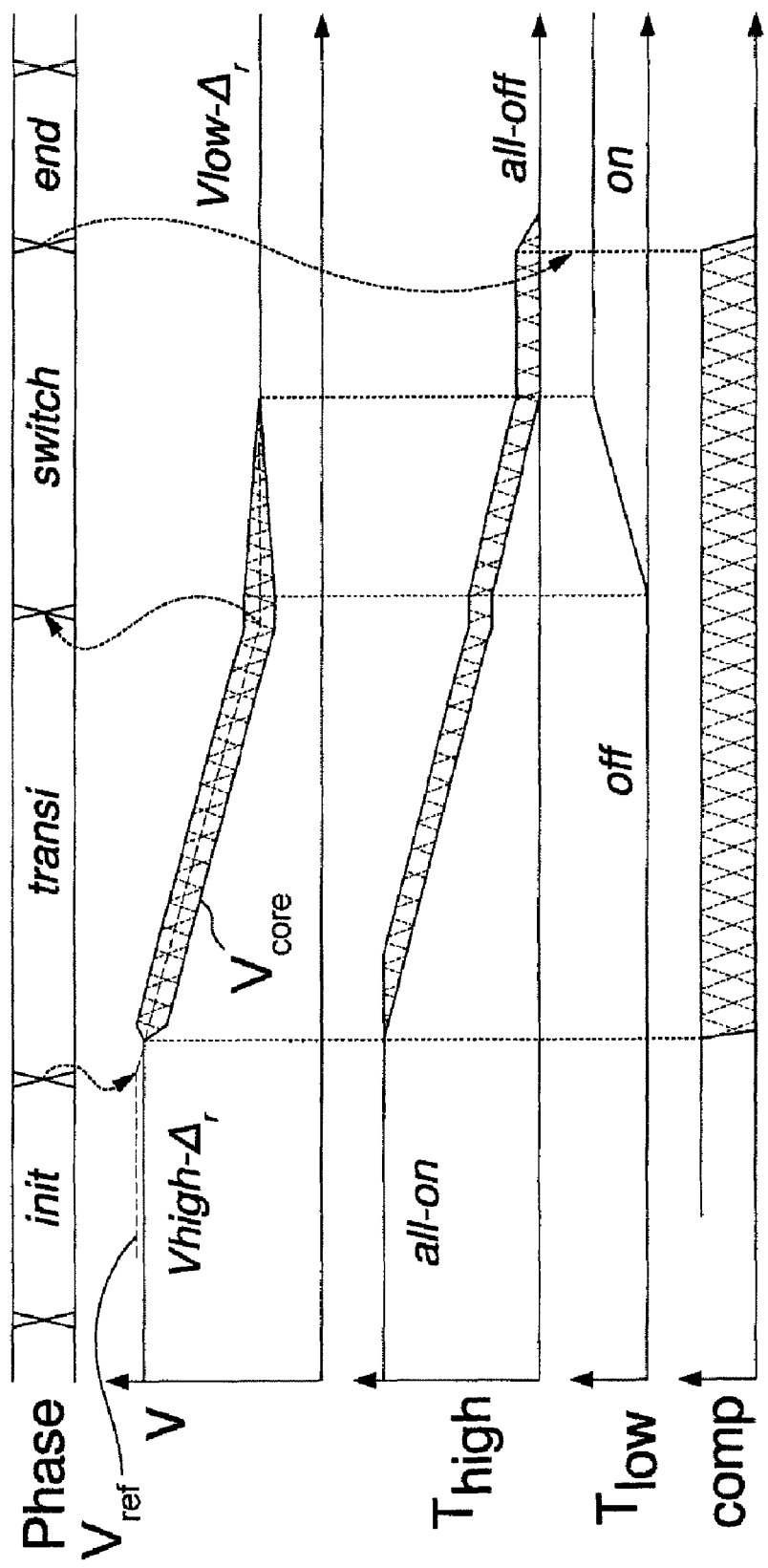
FIG. 5 shows certain signals during a transient downward phase in the context of the device from FIG. 4.

FIG. 5 shows the principal signals generated during a falling transient phase described next.

At the beginning of this transient phase, the voltage at the power supply terminal L is equal to the voltage of the source of the high voltage $V_{high}$ ignoring resistive losses (voltage drop $\Delta_r$). All the transistors $T_{high}$ connecting this voltage source to the power supply terminal L are therefore active (allon in FIG. 5).

On detection by the control unit of a transition to the low power consumption mode, the control unit switches the signal enloop to 1 to activate the various elements of the circuit. The voltage at the output of the digital-analog converter is set to the value $V_{high}$, the softswitch sends a signal fullon and the output of the comparator has the value 1 (since because of resistive losses the voltage $V_{core}$ is slightly lower than $V_{ref}$).

After a few clock cycles (to stabilize the analog elements), the control unit switches to 1 the value of the signal selec, which leads to generation of a falling ramp and reduction of the voltage $V_{ref}$. Because the voltage $V_{core}$ is slaved to this voltage $V_{ref}$, as explained above, the voltage $V_{core}$ also decreases (precisely because of the increase in the voltage drop across the transistors connected to $V_{high}$ because of the reduction of the width of the channel commanded by the softswitch).

When the ramp generator reaches the bottom limit of the ramp, the signal refl goes to 1. When the control unit detects on the one hand the value 1 of the signal refl and on the other hand a change to 1 at the output of the comparator cmp (which indicates that the voltage $V_{core}$ has dropped briefly below the voltage $V_{ref}$), it then (via the signal cmdl sent to the power control circuit pwrdriver) causes the transistor $T_{low}$ connecting the voltage $V_{low}$ to the power supply terminal L to be closed.

As previously mentioned, this closing of the transistor is relatively slow: more and more of the current flows in the transistor $T_{low}$, which leads to a corresponding reduction in the current in the transistors $T_{high}$ and continued closure of those transistors to maintain the voltage to which the system is slaved (the increase in the resistance at the level of the transistors $T_{high}$ made possible by the successive closing of the transistors compensating the reduction in the current in this portion of the power switch in order to maintain a stable voltage drop).

When the transistor $T_{low}$ is turned on completely, the control unit can force the signal upnotdown to 0 until all the transistors $T_{high}$ connected to the voltage $V_{high}$ are turned off (the whole of the word cmdh at 0), which terminates the transition phase because the power supply terminal L is supplied with power only by the source of the low voltage $V_{low}$.

The control unit can then turn off the comparator, the digital-analog converter and the clock (or where appropriate set them to a low consumption mode).

Figure 6:
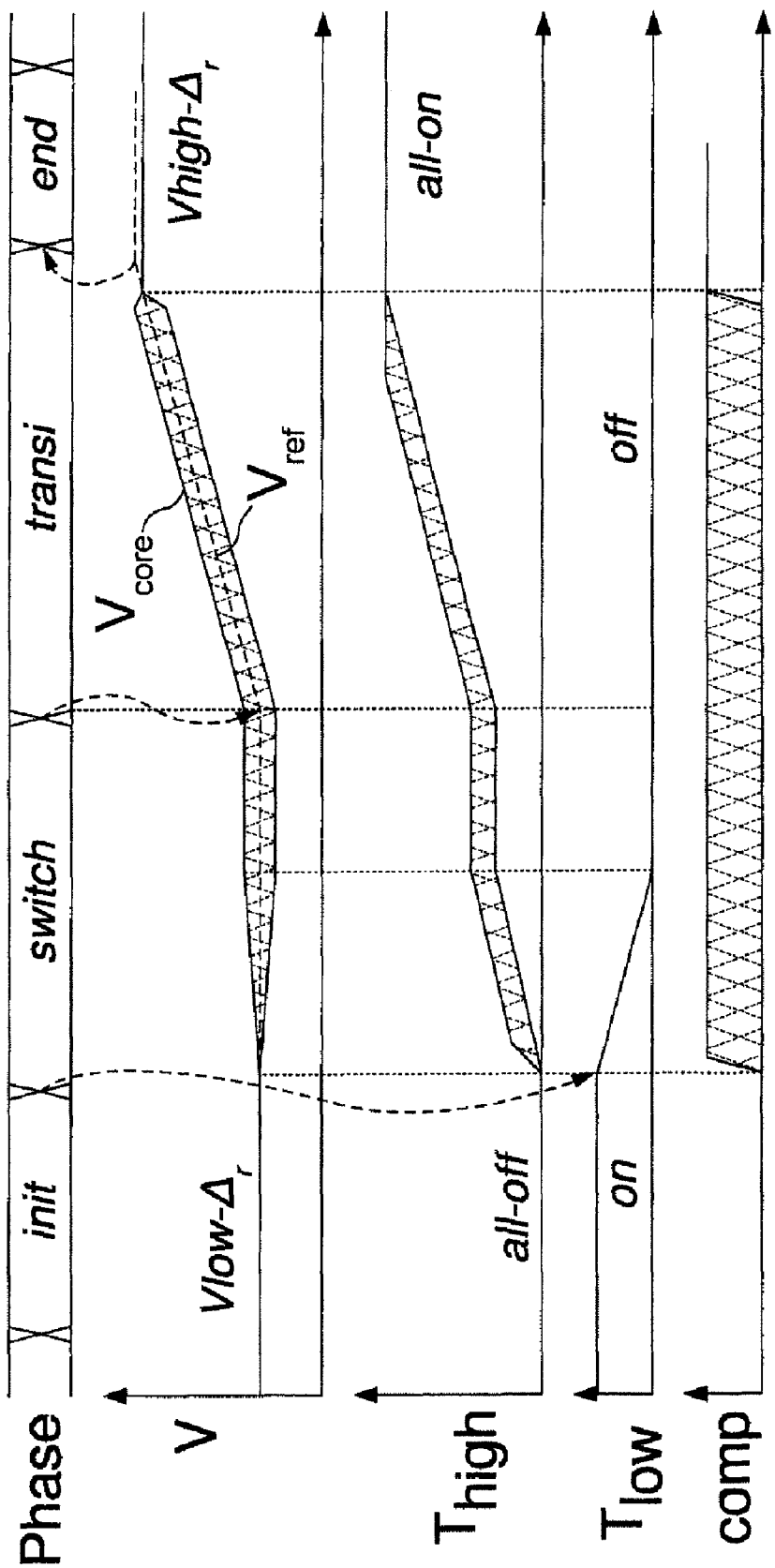
FIG. 6 shows certain signals during a transient upward phase in the context of the device from FIG. 4.

FIG. 6 shows the main signals in the circuit from FIG. 4 during a rising transient phase described next.

As already mentioned, detecting a signal mode indicating the change from a low-voltage power supply regime to a nominal voltage power supply regime, the control unit causes the clock, the comparator and the digital-analog converter to be switched on (for example by the signal enloop going to the level 1).

As already mentioned, the control unit copies the output signal cmp of the comparator to the upnotdown input of the softswitch. The transistors $T_{high}$ that connect the source of the voltage $V_{high}$ to the power supply terminal L begin to be turned on successively (and thus to reduce the voltage drop at their level) until an equilibrium point is reached: at this time, the voltage $V_{core}$ oscillates about the voltage $V_{ref}$ which is approximately equal to $V_{low}$ (to be more precise equal to $V_{low}-\Delta_r$) before generation of the rising voltage ramp.

After a predefined time T enabling the system to achieve equilibrium, the control unit turns off the transistor $T_{low}$ connecting the source of the voltage $V_{low}$ to the power supply terminal L by way of the signal cmdl.

Because of the control function and the reduction of the current in the transistor $T_{low}$ because it is turned off, the current increases on the $T_{high}$ side which (via the control loop) causes the opening of a greater number of transistors $T_{high}$ in order to maintain a stable voltage, by virtue of a phenomenon that is the converse of that described above.

Once the transistor $T_{low}$ is completely turned off, equilibrium is achieved again in which the voltage $V_{core}$ continues to oscillate about the voltage $V_{ref}$.

After a predetermined time, by means of the signal selec the control unit causes a rising ramp to be generated: the voltage $V_{ref}$ increases, followed by the voltage $V_{core}$ thanks to the control function, until they reach the upper limit, namely $V_{high}$, at which all of the transistors $T_{high}$ are turned on (in which case the voltage $V_{core}$ is very slightly less than $V_{high}$ and to be more precise has the value $V_{high}-\Delta_r$). Reaching the upper limit is detected by the control unit when each of the signals refh and fullon has the value 1, for example (the former indicating that the set point has reached the upper limit, the latter indicating that $V_{core}$ has reached the upper limit to take account of any delay in respect of this latter voltage).

This produces a new stable state of the device in which the load is supplied with power only from the source of the voltage $V_{high}$, and the clock can then be switched off and the comparator and the digital-analog converter switched to the low power consumption regime.

The invention is not limited to the embodiments that have just been described. For example, two fixed voltage sources, one variable voltage source and switching means could be provided for changing without discontinuity from a fixed voltage source to the variable voltage source at the beginning of a transition phase to continuous modification of the variable voltage as far as the level of the other voltage source and switching from the variable voltage source to the other voltage source without discontinuity to complete the transition phase.

Another alternative is to envisage the use of two variable sources, one varying between a low voltage and an intermediate voltage and the other between the intermediate voltage and a high voltage, and means for changing continuously from one source to the other when the two voltage sources are generating the intermediate voltage.

The invention claimed is:

1. An electronic circuit power supply device including a switching circuit connecting at least a first voltage or a second voltage to a power supply terminal of an electronic circuit, the power supply device comprising:
   circuitry that evaluates a measured voltage at the power supply terminal; and
   a control unit connected to the switching circuit that applies a variable voltage to the power supply terminal, wherein the voltage ranges from a value equal to the first voltage to a value equal to the second voltage, the variable voltage being determined as a function of the measured voltage and
   that applies the second voltage to the power supply terminal when the variable voltage reaches the second voltage.

2. The power supply device according to claim 1, further comprising a voltage ramp generator, a comparator of the measured voltage and the voltage generated by the ramp generator, and wherein the variable voltage is determined as a function of a comparison generated by the comparator.

3. The power supply device according to claim 1 wherein the control unit further applies a variable voltage to the power supply terminal, wherein the voltage ranges from a value equal to the second voltage to a value equal to the first voltage, the variable voltage being determined as a function of the measured voltage at the power supply terminal, and applies the first voltage to the power supply terminal when the variable voltage reaches the first voltage.

4. The power supply device according to claim 1, wherein the switching circuit comprises at least one first transistor that connects the first voltage to the power supply terminal.

5. The power supply device according to claim 4, wherein the switching circuit further comprises at least one second transistor that connects the second voltage to the power supply terminal wherein the at least one second transistor is separate from the at least one first transistor and is controlled by the control unit.

6. The power supply device according to claim 4 further comprising a plurality of first transistors having a common drain and a common source, one of which is connected to the first voltage, and gates controlled independently by the control unit; and wherein the opening and closing of the transistors is controlled on request of the control unit to apply a variable voltage to the power supply terminal wherein the voltage is variable from a value equal to the first voltage to a value equal to the second voltage.

7. The power supply device according to claim 1, wherein the power supply comprises CMOS technology.

8. The power supply device according to claim 1, wherein the first voltage is greater than the second voltage.

9. The power supply device according to claim 1, wherein the first voltage corresponds to a nominal power supply voltage of the electronic circuit.

10. The power supply device according to claim 1, wherein the switching circuit can connect the power supply terminal to a variable voltage source.

11. The power supply device according to claim 5 further comprising a plurality of second transistors having a common drain and a common source, one of which is connected to the second voltage, and gates controlled independently by the control unit; and wherein the opening and closing of the transistors is controlled by the control unit on request of the control unit to apply a variable voltage to the power supply terminal, wherein the voltage ranges from a value equal to the second voltage to a value equal to the first voltage.

12. An electronic circuit comprising a power supply device according to claim 1, and further comprising a power supply management circuit configured to control the power supply device.

13. An electronic circuit power supply device comprising:
   first and second switches for selectively applying at least a first voltage or a second voltage, respectively, to a power supply terminal of an electronic circuit ;
   a comparator comparing a voltage ramp generated by a digital-analog converter and a measured voltage at the power supply terminal; and
   a control module coupled to the digital-analog converter and coupled to the first and second switches to apply a variable voltage to the power supply terminal,
   wherein the variable voltage ranges from a value equal to the first voltage to a value equal to the second voltage, and wherein the variable voltage is a function of a comparison generated by the comparator, and
   wherein the control module includes circuitry to activate the second switch so as to select the second voltage and apply the second voltage to the power supply terminal when the variable voltage reaches the second voltage.

* * * * *